(12) United States Patent
Ikeda et al.

(10) Patent No.: US 11,608,023 B2
(45) Date of Patent: Mar. 21, 2023

(54) SIDE AIRBAG DEVICE

(71) Applicant: HONDA MOTOR CO., LTD., Tokyo (JP)

(72) Inventors: Koji Ikeda, Tokyo (JP); Yu Kanayama, Tokyo (JP); Hisaki Sugaya, Saitama (JP); Takayuki Kawabuchi, Saitama (JP); Hiroyuki Hirayama, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/675,159

(22) Filed: Feb. 18, 2022

(65) Prior Publication Data
US 2022/0281403 A1 Sep. 8, 2022

(30) Foreign Application Priority Data
Mar. 2, 2021 (JP) .............................. JP2021-032954

(51) Int. Cl.
*B60R 21/231* (2011.01)
*B60R 21/207* (2006.01)

(52) U.S. Cl.
CPC ...... *B60R 21/23138* (2013.01); *B60R 21/207* (2013.01); *B60R 2021/23107* (2013.01); *B60R 2021/23146* (2013.01)

(58) Field of Classification Search
None
See application file for complete search history.

(56) References Cited

U.S. PATENT DOCUMENTS

| | | | | |
|---|---|---|---|---|
| 8,702,123 B2 * | 4/2014 | Mazanek | ............... | B60R 21/207 |
| | | | | 280/730.2 |
| 9,403,500 B2 * | 8/2016 | Ishida | ................... | B60R 21/207 |
| 10,464,517 B2 * | 11/2019 | Kobayashi | ............ | B60R 21/207 |
| 10,744,970 B2 * | 8/2020 | Ohno | ..................... | B60R 21/215 |
| 2008/0231026 A1 * | 9/2008 | Naito | ................ | B60R 21/23138 |
| | | | | 280/730.2 |
| 2012/0217731 A1 | 8/2012 | Baba et al. | | |
| 2019/0232914 A1 * | 8/2019 | Kobayashi | ............ | B60R 21/233 |
| 2022/0055570 A1 * | 2/2022 | Kobayashi | ............ | B60R 21/215 |
| 2022/0281402 A1 * | 9/2022 | Kanayama | ........ | B60R 21/23138 |

FOREIGN PATENT DOCUMENTS

| | | | | |
|---|---|---|---|---|
| DE | 102015204939 A1 * | 10/2015 | ....... | B60R 21/01512 |
| DE | 102020124808 A1 * | 4/2021 | | |
| JP | 2012179956 A | 9/2012 | | |

* cited by examiner

*Primary Examiner* — Faye M Fleming
(74) *Attorney, Agent, or Firm* — Armstrong Teasdale LLP

(57) ABSTRACT

A side airbag device is provided in a seat back of a vehicle seat. The side airbag device includes: a primary airbag configured to be inflated and deployed forward and in an up-and-down direction from an outer portion of the seat back in a vehicle width direction; and a secondary airbag connected to an inner portion of the primary airbag in the vehicle width direction, communicating with the primary airbag through a first communication hole, and configured to be inflated and deployed inward in the vehicle width direction from the primary airbag. The first communication hole is at least partially arranged more forward than a front surface of the outer portion of the seat back in an inflated and deployed state of the primary airbag. The secondary airbag comes in contact with a front surface of the seat back in an inflated and deployed state of the secondary airbag.

16 Claims, 9 Drawing Sheets

Fig.4
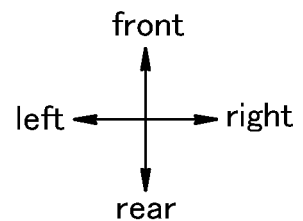
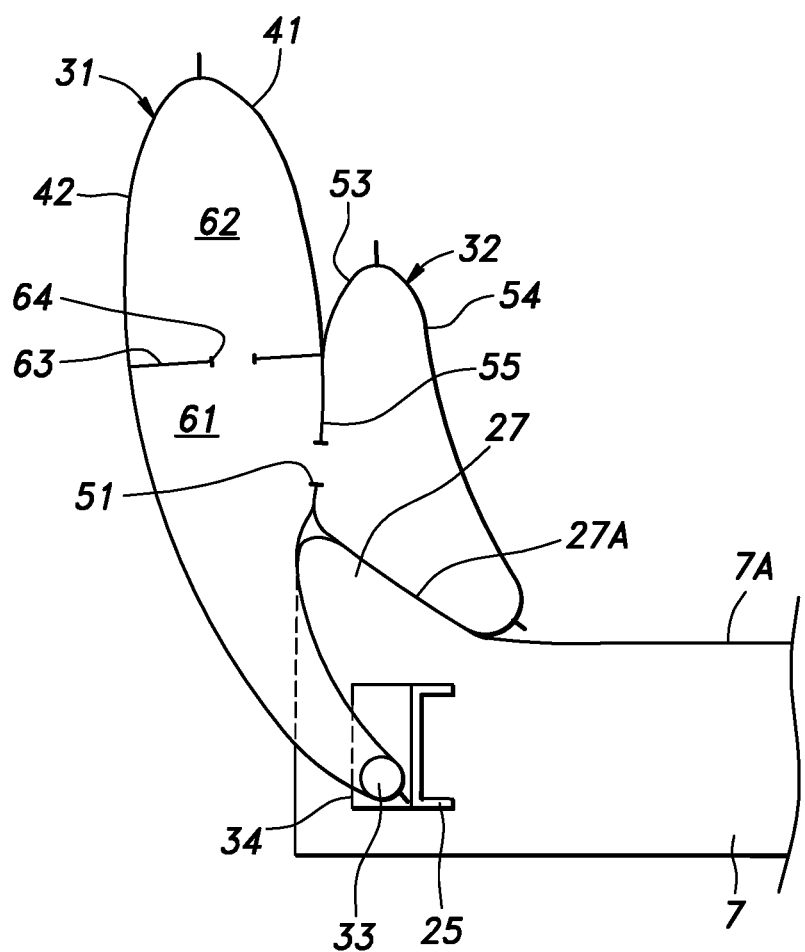

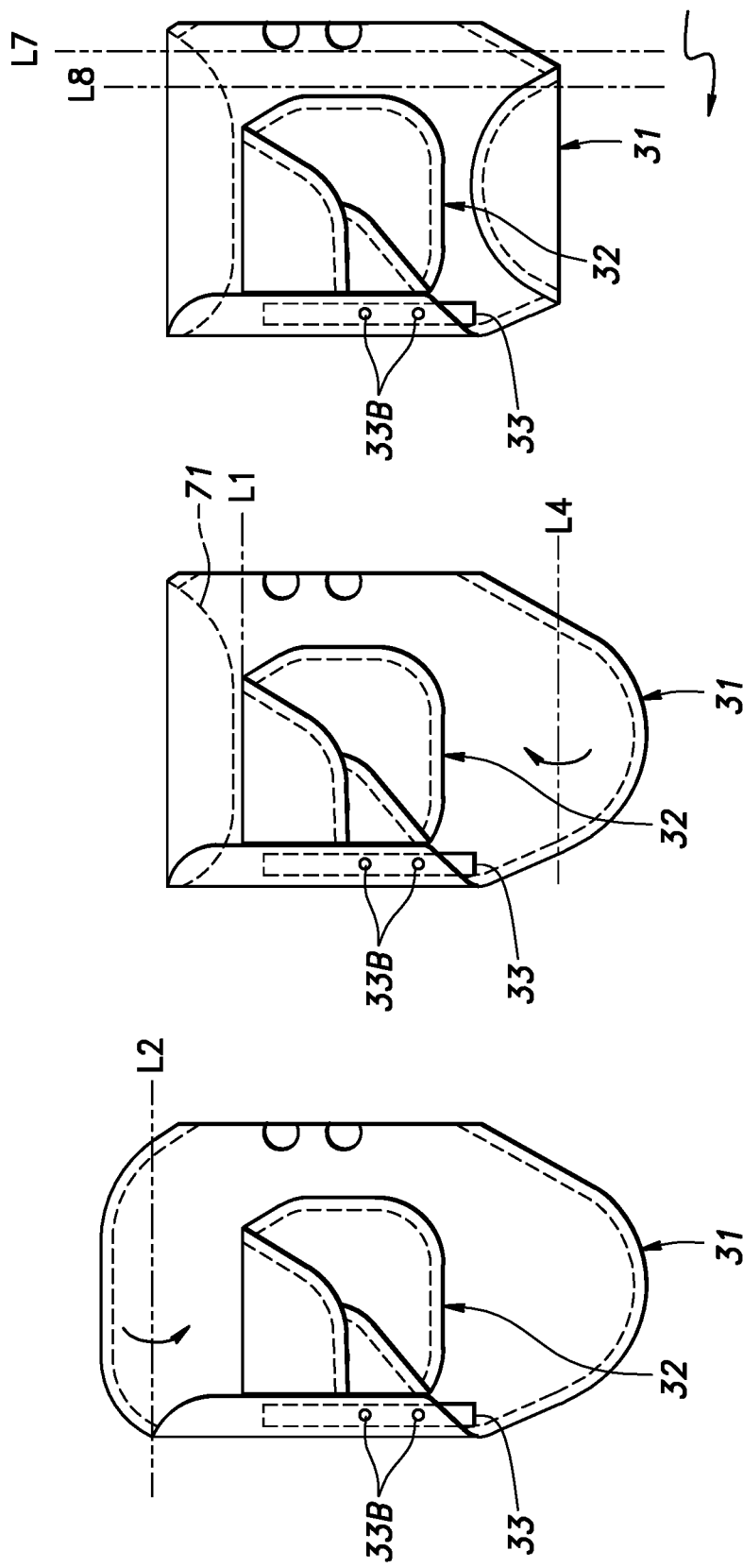

SIDE AIRBAG DEVICE

TECHNICAL FIELD

The present invention relates to a side airbag device.

BACKGROUND ART

JP2012-179956A discloses a side airbag device provided in a seat back of a vehicle seat. The side airbag device includes: a primary airbag configured to be inflated and deployed forward and in an up-and-down direction from an outer portion of the seat back in a vehicle width direction; and a secondary airbag connected to an inner portion of the primary airbag in the vehicle width direction, communicating with the primary airbag through a communication hole, and configured to be inflated and deployed inward in the vehicle width direction from the primary airbag.

In the side airbag device according to JP2012-179956A, a connecting portion of the primary airbag and the secondary airbag overlaps with the seat back when viewed in the vehicle width direction. Accordingly, it is difficult for the secondary airbag to enter a front surface side of the seat back at the time of inflation and deployment. Accordingly, a space is formed between an occupant and the primary airbag, which may lower the ability to restrain the occupant. Further, since the secondary airbag comes in contact with the seat back at the time of inflation and deployment, the position of the secondary airbag at the time of inflation and deployment may become unstable.

SUMMARY OF THE INVENTION

In view of the above background, an object of the present invention is to provide a side airbag device that includes a primary airbag and a secondary airbag and can stabilize the position of the secondary airbag at the time of inflation and deployment and enhance the ability to restrain the occupant.

To achieve such an object, one aspect of the present invention provides a side airbag device (1) provided in a seat back (7) of a vehicle seat (3), the side airbag device comprising: a primary airbag (31) configured to be inflated and deployed forward and in an up-and-down direction from an outer portion of the seat back in a vehicle width direction; and a secondary airbag (32) connected to an inner portion of the primary airbag in the vehicle width direction, communicating with the primary airbag through a first communication hole (51), and configured to be inflated and deployed inward in the vehicle width direction from the primary airbag, wherein the first communication hole is at least partially arranged more forward than a front surface of the outer portion of the seat back in an inflated and deployed state of the primary airbag, and the secondary airbag comes in contact with a front surface of the seat back in an inflated and deployed state of the secondary airbag.

According to this aspect, the first communication hole is at least partially arranged more forward than the front surface of the outer portion of the seat back in the inflated and deployed state of the primary airbag, so that the secondary airbag can smoothly enter a front surface side of the seat back. The inflated and deployed secondary airbag comes in contact with the front surface of the seat back, and thus the position of the inflated and deployed secondary airbag becomes stable. The secondary airbag coming in contact with the front surface of the seat back fills a gap between an occupant and the primary airbag so as to restrain the occupant. Accordingly, the side airbag device can stabilize the position of the secondary airbag at the time of inflation and deployment and enhance the ability to restrain the occupant.

In the above aspect, preferably, the seat back includes left and right side support portions protruding forward from left and right side portions (27) of the seat back and extending in the up-and-down direction, the front surface of the seat back includes an inclined surface (27A) defined by one of the side support portions on an outer side in the vehicle width direction and inclined rearward and inward in the vehicle width direction, and the secondary airbag comes in contact with the inclined surface in the inflated and deployed state of the secondary airbag.

According to this aspect, the secondary airbag is guided by the inclined surface inclined rearward and inward in the vehicle width direction, and thus deployed toward the occupant. Accordingly, the side airbag device can enhance the ability to restrain the occupant.

In the above aspect, preferably, the secondary airbag is provided with an upper edge (32A) inclined downward and forward in the inflated and deployed state of the secondary airbag.

According to this aspect, at the time of inflation and deployment of the secondary airbag, the upper edge of the secondary airbag can lift an arm of the occupant upward. Accordingly, the secondary airbag can come in contact with a torso of the occupant, so that the ability to restrain the occupant can be enhanced.

In the above aspect, preferably, the upper edge of the secondary airbag in the inflated and deployed state is arranged lower than an upper edge (31A) of the primary airbag in the inflated and deployed state.

According to this aspect, the secondary airbag can be inflated and deployed toward the occupant.

In the above aspect, preferably, the upper edge of the secondary airbag in the inflated and deployed state is arranged lower than a shoulder joint (101) of an occupant (100) seated on a seat.

According to this aspect, the secondary airbag can reliably restrain an upper portion of the torso of the occupant.

In the above aspect, preferably, the first communication hole is arranged higher than an up-and-down center of the primary airbag in the inflated and deployed state.

According to this aspect, the secondary airbag is arranged in a position corresponding to the upper portion of the torso (namely, a side portion of a chest) of the occupant. Accordingly, the secondary airbag can reliably restrain the upper portion of the torso of the occupant.

In the above aspect, preferably, the primary airbag includes a partition wall (63) dividing an inside thereof into a first chamber (61) and a second chamber (62), the partition wall is provided with a second communication hole (64) through which the first chamber and the second chamber communicate with each other, the first chamber is provided with an inflator (33), and the first chamber and an inside of the secondary airbag communicate with each other through the first communication hole.

According to this aspect, the inflation and deployment of the secondary airbag can be started before the inflation and deployment of the primary airbag is completed.

In the above aspect, preferably, a door (11) is provided on an outer side of the seat back in the vehicle width direction, the door is provided with an armrest (13) protruding inward in the vehicle width direction and provided with a mount surface (14) facing upward, and a lower edge of the secondary airbag in the inflated and deployed state is arranged higher than the mount surface.

According to this aspect, the secondary airbag and the upper portion of the primary airbag can fill a space between a portion of the door higher than the armrest and the occupant. Accordingly, the ability to restrain the occupant can be enhanced.

In the above aspect, preferably, the lower edge of the secondary airbag in the inflated and deployed state extends horizontally in a front-and-rear direction.

According to this aspect, the secondary airbag can be arranged so as to correspond to a space above the armrest.

In the above aspect, preferably, a window opening (15) is provided in an upper portion of the door, and an upper edge of the secondary airbag in the inflated and deployed state is arranged lower than the window opening.

According to this aspect, the secondary airbag is arranged in a position corresponding to the torso of the occupant, and can reliably support the torso thereof.

Thus, according to the above aspects, it is possible to provide a side airbag device that includes a primary airbag and a secondary airbag and can stabilize the position of the secondary airbag at the time of inflation and deployment and enhance the ability to restrain the occupant.

BRIEF DESCRIPTION OF THE DRAWING(S)

FIG. 4 is an explanatory diagram showing the inflated and deployed state of the side airbag device;

FIG. 8A is an explanatory diagram showing the folding method of the primary airbag and the secondary airbag;

FIG. 8B is an explanatory diagram showing the folding method of the primary airbag and the secondary airbag;

FIG. 8C is an explanatory diagram showing the folding method of the primary airbag and the secondary airbag;

DETAILED DESCRIPTION OF THE INVENTION

In the following, an embodiment of a side airbag device of the present invention will be described. In the following description, each direction is defined based on a seat and a vehicle in which the side airbag device is provided. Hereinafter, "front-and-rear direction" matches the front-and-rear direction of the vehicle, and "lateral direction" matches the vehicle width direction of the vehicle.

Figure 1:
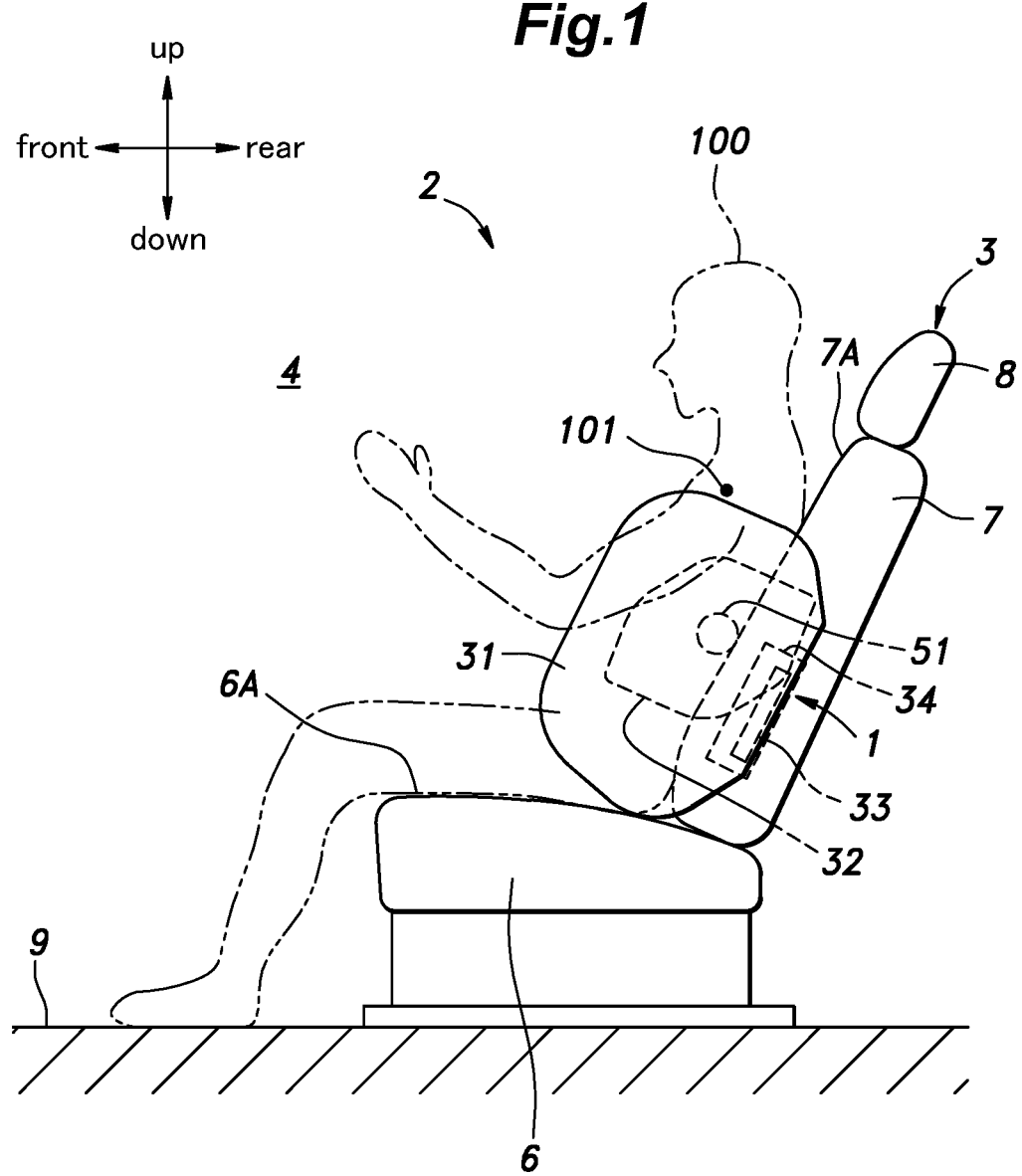
FIG. 1 is a side view showing an inflated and deployed state of a side airbag device according to an embodiment.
Figure 2:
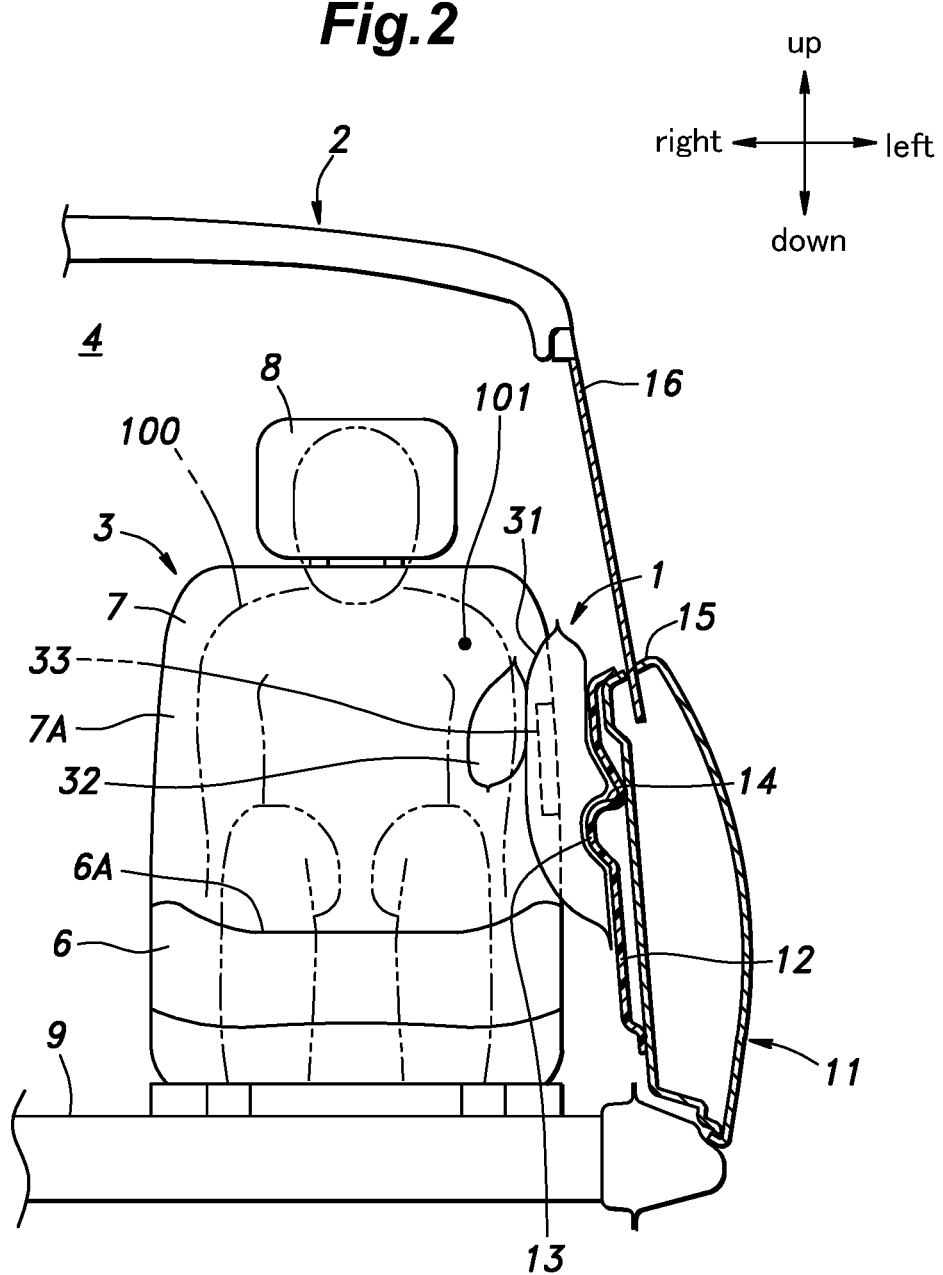
FIG. 2 is a front view showing the inflated and deployed state of the side airbag device.

As shown in FIGS. 1 and 2, a side airbag device 1 is provided in a seat 3 of a vehicle 2. The seat 3 is provided in a vehicle cabin 4 of the vehicle 2. In the present embodiment, the seat 3 is a seat on a left side in a front row. The seat 3 includes a seat cushion 6, a seat back 7, and a headrest 8. The seat cushion 6 is provided on a floor 9, which forms the bottom of the vehicle cabin 4. The seat cushion 6 has an upper surface 6A that supports buttocks of an occupant 100 from below. The seat back 7 extends upward from a rear portion of the seat cushion 6. The seat back 7 has a front surface 7A that supports a back of the occupant 100 from behind. The headrest 8 is provided at an upper end of the seat back 7 and supports a head of the occupant 100 from behind.

As shown in FIG. 2, a door 11 of the vehicle 2 is provided on an outer side of the seat 3 (seat back 7) in the vehicle width direction. A door trim 12 is provided on an inner side surface of a lower portion of the door 11. The door trim 12 is provided with an armrest 13 protruding inward in the vehicle width direction and extending in the front-and-rear direction. An upper portion of the armrest 13 is provided with a mount surface 14 facing upward. A window opening 15 is provided in an upper portion of the door 11. A lower edge of the window opening 15 extends in the front-and-rear direction (in the substantially horizontal direction). A windowpane 16 that can be raised and lowered is provided in the window opening 15.

Figure 3:
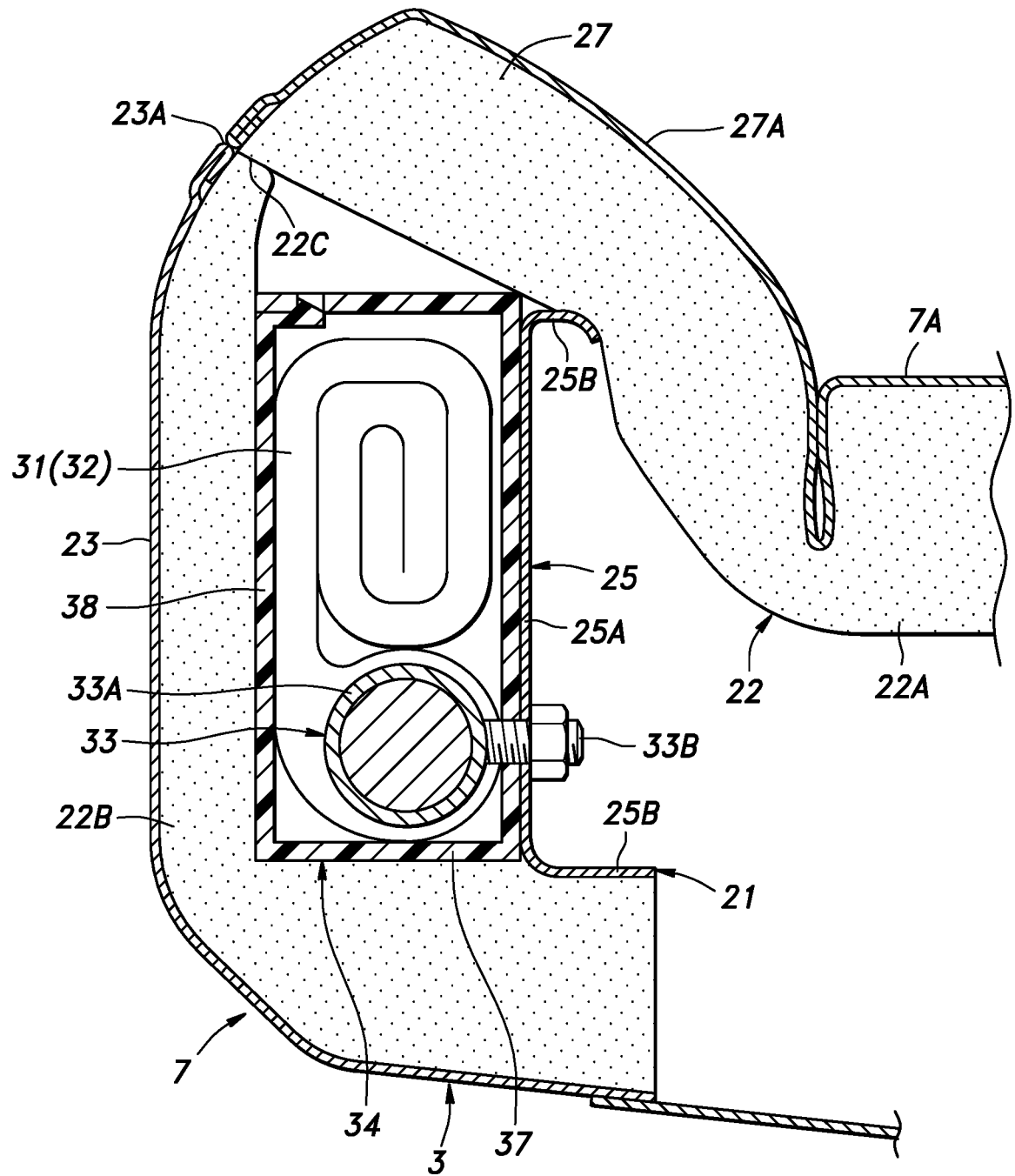
FIG. 3 is a cross-sectional view showing a storage state of the side airbag device.

As shown in FIG. 3, the seat back 7 includes a seat back frame 21 forming a skeleton thereof, a pad 22 supported by the seat back frame 21, and a skin material 23 covering the pad 22. The seat back frame 21 includes left and right side members 25 extending in the up-and-down direction. It is preferable that the left and right side members 25 are connected to each other by an upper member and a lower member extending in the lateral direction. Lower ends of the left and right side members 25 are coupled to a seat cushion frame forming a skeleton of the seat cushion 6. The left and right side members 25 include one side member 25 (hereinafter referred to as "outer side member 25") arranged on an outer side of the other side member 25 in the vehicle width direction. The outer side member 25 includes a side wall portion 25A whose surfaces face left and right sides and front and rear edge wall portions 25B protruding inward in the vehicle width direction from front and rear edges of the side wall portion 25A.

The pad 22 includes a pad front portion 22A and left and right pad side portions 22B. The pad front portion 22A extends in the lateral direction and is arranged on a front side of the left and right side members 25. The left and right pad side portions 22B extend rearward from both lateral ends of the pad front portion 22A, and are arranged on outer sides of the corresponding left and right side members 25 in the lateral direction. The skin material 23 is arranged along a surface of the pad 22. A first rupturable portion 22C extending in the up-and-down direction is formed at a boundary between the pad front portion 22A and one pad side portion 22B on an outer side of the other pad side portion 22B in the vehicle width direction. The first rupturable portion 22C is configured to be ruptured with a tensile load smaller than a tensile load with which the pad front portion 22A and the pad side portions 22B are ruptured. The thickness of the first rupturable portion 22C is set to be smaller than those of the pad front portion 22A and the pad side portions 22B. A second rupturable portion 23A is formed in an opposed portion (a portion opposed to the first rupturable portion 22C) of the skin material 23. The second rupturable portion 23A is configured to be ruptured with a tensile load smaller than a tensile load with which the other portions of the skin material 23 are ruptured. For example, the second rupturable portion 23A may be composed of a slit and a relatively weak thread with which the slit is sewn up.

A front portion of the seat back 7 is composed of the pad 22 and the skin material 23, and left and right side portions of the front portion of the seat back 7 are provided with left and right side support portions 27 protruding forward and extending in the up-and-down direction. Left and right inclined surfaces 27A inclined rearward and toward the center of the seat 3 in the vehicle width direction are provided in front portions of the left and right side support portions 27. That is, one inclined surface 27A on an outer side of the other inclined surface 27A in the vehicle width direction is inclined rearward and inward in the vehicle width direction. The left and right inclined surfaces 27A compose a portion of the front surface 7A of the seat back 7.

As shown in FIGS. 1, 2 and 4, the side airbag device 1 includes a primary airbag 31, a secondary airbag 32 connected to the primary airbag 31, an inflator 33 arranged inside the primary airbag 31 and configured to generate gas, and a case 34 configured to accommodate the folded primary airbag 31, the folded secondary airbag 32, and the inflator 33. In another embodiment, the case 34 may be omitted and the folded primary airbag 31 and the folded secondary airbag 32 may be held by a binding member such as a tape configured to be ruptured with a prescribed load.

The primary airbag 31 and the secondary airbag 32 (side airbag device 1) can turn into a storage state (see FIG. 3), a deployed state (see FIG. 6), and an inflated and deployed state (see FIGS. 1, 2, and 4). In the storage state, the primary airbag 31 and the secondary airbag 32 are folded, and can be accommodated in the case 34. In the deployed state, the primary airbag 31 and the secondary airbag 32 are deployed in a flat shape, and overlap with each other. In the inflated and deployed state, air is supplied inside the primary airbag 31 and the secondary airbag 32, and thus the primary airbag 31 and the secondary airbag 32 are inflated.

As shown in FIG. 3, the inflator 33 includes a housing 33A formed in a columnar shape and at least one coupled portion 33B (in the present embodiment, two coupled portions 33B) extending radially outward from the housing 33A. Each coupled portion 33B may consist of a stud bolt. The coupled portion 33B extends (penetrates) through the primary airbag 31 and the case 34 so as to protrude therefrom, and is fastened (coupled) to the side wall portion 25A of the side member 25 by a nut. By fixing the inflator 33 to the seat back 7, the side airbag device 1 is fixed to the seat back 7. In a state where the side airbag device 1 is fixed to the seat back 7, the inflator 33 extends in the up-and-down direction so as to parallel to the side member 25. A lower end of the inflator 33 is connected to an electronic control unit of the vehicle 2 via a wire harness. When detecting acceleration equal to or greater than a threshold value, the electronic control unit supplies a prescribed electric current to the inflator 33 via the wire harness. When supplied with the electric current from the electronic control unit, the inflator 33 generates the gas and inflates the primary airbag 31 and the secondary airbag 32. For example, an igniter and a gas generator are arranged inside the housing 33A. The igniter ignites the gas generator when supplied with the electric current, and the gas generator generates the gas when ignited by the igniter.

Figure 5:
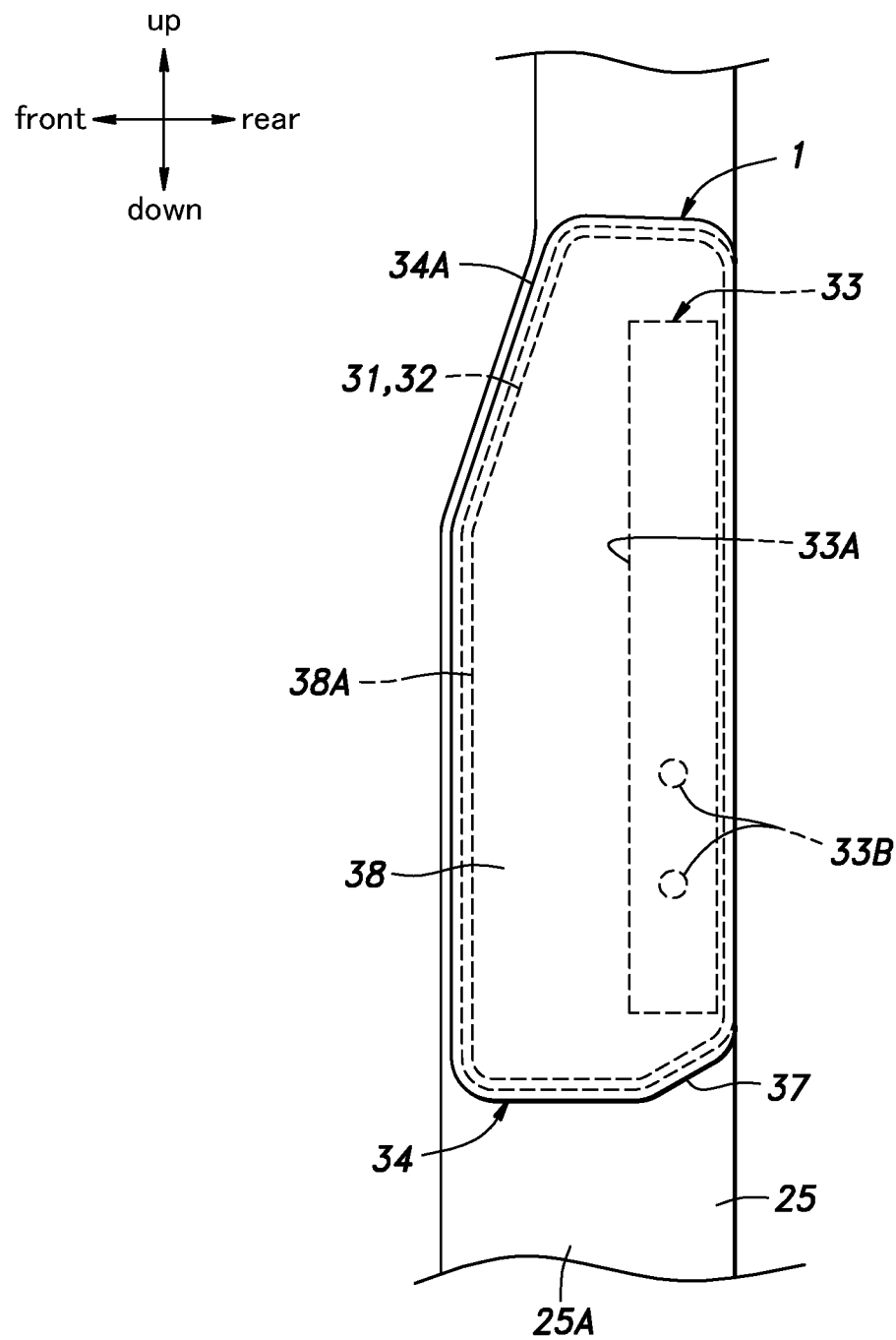
FIG. 5 is a side view of a side member and a case.

As shown in FIGS. 3 and 5, the case 34 has a box-like case body portion 37 having an opening facing outward in the vehicle width direction and a case lid portion 38 closing the opening of the case body portion 37. The bottom of the case body portion 37 comes in contact with the side wall portion 25A of the side member 25, and each coupled portion 33B of the inflator 33 penetrates the bottom of the case body portion 37. The case 34 extends in the up-and-down direction. A front upper portion 34A of the case 34 is inclined rearward and upward. The front-and-rear length of the case 34 is gradually reduced as the case 34 extends upward. After the primary airbag 31, the secondary airbag 32, and the inflator 33 are accommodated in the case body portion 37, the case lid portion 38 closes the opening of the case body portion 37. A third rupturable portion 38A extending in the up-and-down direction is formed on a front edge, upper edge, and lower edge of the case lid portion 38.

Figure 6:
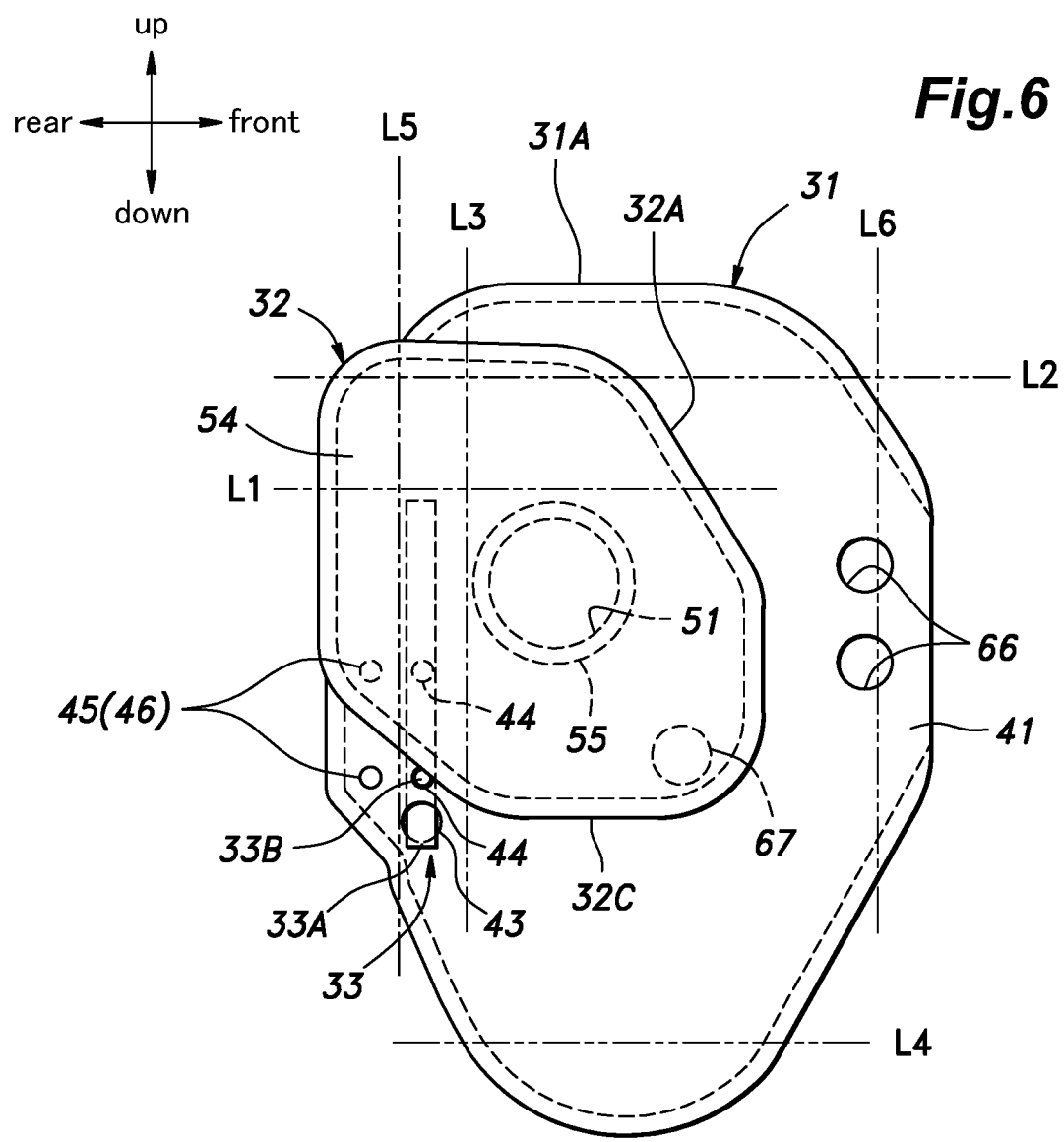
FIG. 6 is an explanatory diagram showing a deployed state of a primary airbag and a secondary airbag.

As shown in FIGS. 4 and 6, the primary airbag 31 is configured to be inflated and deployed forward and in the up-and-down direction from an outer portion of the seat back 7 in the vehicle width direction. The primary airbag 31 includes a first sheet material 41 and a second sheet material 42. The first sheet material 41 and the second sheet material 42 overlap with each other, and are sewn together at outer circumferential edges thereof. The first sheet material 41 and the second sheet material 42 may be formed by folding one continuous sheet material. For example, each of the first sheet material 41 and the second sheet material 42 may consist of a fabric made of nylon or polyester.

In the inflated and deployed state of the primary airbag 31, the first sheet material 41 forms an inward facing portion (a portion facing inward in the vehicle width direction) of the primary airbag 31, and the second sheet material 42 forms an outward facing portion (a portion facing outward in the vehicle width direction) of the primary airbag 31. The first sheet material 41 and the second sheet material 42 extend in the front-and-rear direction and the up-and-down direction. In the present embodiment, the up-and-down length of each of the first sheet material 41 and the second sheet material 42 is greater than the front-and-rear length thereof.

In a rear portion of the first sheet material 41, an insertion hole 43 through which the inflator 33 is inserted into the primary airbag 31 and two first through holes 44 and two second through holes 45 through which the two coupled portions 33B of the inflator 33 pass are formed. Each of the insertion hole 43, the two first through holes 44, and the two second through holes 45 penetrates the first sheet material 41. In the second sheet material 42, two third through holes 46 are formed at positions corresponding to the two second through holes 45. Each of the two third through holes 46 penetrates the second sheet material 42. The two first through holes 44 are arranged above the insertion hole 43, and aligned at an interval on a straight line passing through the insertion hole 43 and extending in the up-and-down direction. The up-and-down distance between the two first through holes 44 is set to be equal to the distance between the two coupled portions 33B of the inflator 33. Each of the two second through holes 45 is arranged behind the two first through holes 44.

Figure 7C:
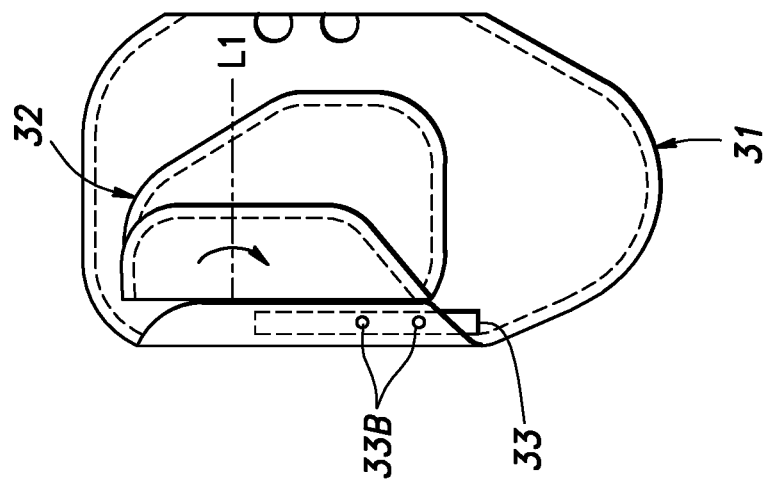
FIG. 7C is an explanatory diagram showing the folding method of the primary airbag and the secondary airbag.

The inflator 33 is arranged inside the primary airbag 31 through the insertion hole 43. A lower end of the inflator 33 may protrude from the insertion hole 43 to an outside of the primary airbag 31. The two coupled portions 33B of the inflator 33 pass through the two first through holes 44 and protrude to the outside of the primary airbag 31. As shown in FIG. 7A, rear ends of the first sheet material 41 and the second sheet material 42 are folded to a side of the first sheet material 41 along a fifth fold L5, which will be described later. The fifth fold L5 extends in the up-and-down direction between the two first through holes 44 and the two second through holes 45. Accordingly, the two second through holes 45 and the two third through holes 46 are arranged at positions opposed to the two first through holes 44. Accordingly, the two coupled portions 33B protruding from the two first through holes 44 pass through the second through holes 45 and the third through holes 46. Consequently, the first sheet material 41 and the second sheet material 42 doubled in two layers are arranged between the inflator 33 and the side member 25. In this way, the primary airbag 31 is fixed to the inflator 33 and the side member 25.

As shown in FIGS. 4 and 6, the secondary airbag 32 is connected to an inner portion of the primary airbag 31 in the vehicle width direction, communicates with the primary airbag 31 through a first communication hole 51, and is configured to be inflated and deployed inward in the vehicle width direction from the primary airbag 31. The secondary airbag 32 includes a third sheet material 53 and a fourth sheet material 54. The third sheet material 53 and the fourth sheet material 54 overlap with each other, and are sewn together at outer circumferential edges thereof. The third sheet material 53 and the fourth sheet material 54 may be formed by folding one continuous sheet material. Each of the third sheet material 53 and the fourth sheet material 54 may consist of the same seat material as the first sheet material 41.

In the inflated and deployed state of the primary airbag 31 and the secondary airbag 32, the third sheet material 53 forms an outward facing portion (a portion facing outward in the vehicle width direction) of the secondary airbag 32, and the fourth sheet material 54 forms an inward facing portion (a portion facing inward in the vehicle width direction) of the secondary airbag 32. The third sheet material 53 and the fourth sheet material 54 extend in the front-and-rear direction and the up-and-down direction. In the present embodiment, the up-and-down length of each of the third sheet material 53 and the fourth sheet material 54 is greater than the front-and-rear length thereof.

The third sheet material 53 of the secondary airbag 32 is opposed to the first sheet material 41 of the primary airbag 31 and connected to the first sheet material 41 via an annular connecting portion 55. In the connecting portion 55, the third sheet material 53 and the first sheet material 41 overlap with each other, and are sewn together. A first communication hole 51 is provided in the annular connecting portion 55, and penetrates the first sheet material 41 and the third sheet material 53 in the thickness direction thereof. The first communication hole 51 is formed in a circular shape.

As shown in FIG. 4, the primary airbag 31 includes a partition wall 63 dividing an inside thereof into a first chamber 61 and a second chamber 62. The partition wall 63 may be made of a seat material similar to the first sheet material 41. The partition wall 63 extends in the up-and-down direction. An inner side edge of the partition wall 63 in the vehicle width direction is sewn to the first sheet material 41, and an outer side edge of the partition wall 63 in the vehicle width direction is sewn to the second sheet material 42. Upper and lower edges of the partition wall 63 may be movable relative to the first sheet material 41 and the second sheet material 42, or sewn to the first sheet material 41 and the second sheet material 42. The seam of the partition wall 63 and the first sheet material 41 and the seam of the partition wall 63 and the second sheet material 42 extend linearly in the up-and-down direction. It is preferable that these seams are arranged more rearward than the front-and-rear center of each of the first sheet material 41 and the second sheet material 42.

The first chamber 61 is formed behind the partition wall 63, namely, in a rear portion of the primary airbag 31. The second chamber 62 is formed in front of the partition wall 63, namely, in a front portion of the primary airbag 31. In the inflated and deployed state of the primary airbag 31, the volume of the first chamber 61 may be smaller than that of the second chamber 62.

The partition wall 63 is provided with at least one second communication hole 64 through which the first chamber 61 and the second chamber 62 communicate with each other. In the present embodiment, two second communication holes 64 are arranged in the center of the partition wall 63 at an interval in the up-and-down direction.

The first communication hole 51 is provided in a portion of the first sheet material 41 that forms the first chamber 61. That is, the inside of the secondary airbag 32 communicates with the first chamber 61 through the first communication hole 51. In other words, in the first sheet material 41, the first communication hole 51 is arranged more rearward than the seam of the first sheet material 41 and the partition wall 63.

As shown in FIG. 6, at least one first discharge hole 66 is provided at a front end of at least one of the first sheet material 41 and the second sheet material 42. The inside and outside of the primary airbag 31 communicate with each other through the first discharge hole 66, and thus the internal pressure of the primary airbag 31 is lowered. In the present embodiment, two first discharge holes 66 are provided at the front end of the first sheet material 41 at an interval in the up-and-down direction. At least one second discharge hole 67 is provided at a front end of at least one of the third sheet material 53 and the fourth sheet material 54. The inside and outside of the secondary airbag 32 communicate with each other through the second discharge hole 67, and thus the internal pressure of the secondary airbag 32 is lowered. In the present embodiment, one second discharge hole 67 is provided at the front end of the fourth sheet material 54.

In the deployed state and the inflated and deployed state of the primary airbag 31 and the secondary airbag 32, the up-and-down length of the secondary airbag 32 is shorter than the up-and-down length of the primary airbag 31, and the front-and-rear length of the secondary airbag 32 is shorter than the front-and-rear length of the primary airbag 31. Further, in the inflated and deployed state of the primary airbag 31 and the secondary airbag 32, the lateral length of the secondary airbag 32 is shorter than the lateral length of the primary airbag 31.

As shown in FIGS. 1 and 6, the first communication hole 51 and the connecting portion 55 are arranged in the central portion of the third sheet material 53. The secondary airbag 32 extends upward, downward, forward, and rearward from the first communication hole 51 and the connecting portion 55.

As shown in FIGS. 1 and 4, in the inflated and deployed state of the primary airbag 31, the first communication hole 51 is at least partially arranged more forward than the front surface 7A of the outer portion of the seat back 7. More specifically, in the inflated and deployed state of the primary airbag 31, the first communication hole 51 is arranged more forward than the inclined surface 27A of the side support portion 27. In the inflated and deployed state of the primary airbag 31, a front end of the first communication hole 51 is arranged more forward than the front surface 7A of the outer portion of the seat back 7. The entire first communication hole 51 may be arranged more forward than the front surface 7A of the outer portion of the seat back 7. That is, a rear edge of the first communication hole 51 may be arranged more forward than the front surface 7A of the outer portion of the seat back 7. Alternatively, the rear edge of the first communication hole 51 may be arranged more rearward than the front surface 7A of the outer portion of the seat back 7.

The secondary airbag 32 is configured to be inflated and deployed inward in the vehicle width direction from the first communication hole 51, and extends more forward than the front surface 7A of the seat back 7. A rear portion of the secondary airbag 32 comes in contact with the front surface 7A of the seat back 7, and extends inward in the vehicle width direction along the front surface 7A of the seat back 7. In particular, in the inflated and deployed state of the secondary airbag 32, the rear portion of the secondary airbag 32 comes in contact with the inclined surface 27A of the side support portion 27.

An upper edge 32A of the secondary airbag 32 in the inflated and deployed state is inclined downward and forward. The upper edge 32A of the secondary airbag 32 is inclined from an upper side of the first communication hole 51 and the connecting portion 55 to a front edge of the secondary airbag 32. The upper edge 32A of the secondary airbag 32 in the inflated and deployed state is arranged lower than an upper edge 31A of the primary airbag 31 in the inflated and deployed state. The upper edge 32A of the secondary airbag 32 in the inflated and deployed state is arranged lower than a shoulder joint 101 of the occupant 100 seated on the seat 3.

As shown in FIG. 2, a lower edge 32C (see FIG. 6) of the secondary airbag 32 in the inflated and deployed state is arranged higher than the mount surface 14 of the armrest 13. According to such a configuration, the secondary airbag 32 and an upper portion of the primary airbag 31 can fill a space between a portion of the door 11 higher than the armrest 13 and the occupant 100. Accordingly, the ability to restrain the occupant 100 can be enhanced. The lower edge 32C of the secondary airbag 32 in the inflated and deployed state extends horizontally in the front-and-rear direction. That is, the lower edge 32C of the secondary airbag 32 in the inflated and deployed state extends parallel to the mount surface 14 of the armrest 13. According to such a configuration, the secondary airbag 32 can be arranged so as to correspond to a space above the armrest 13. The upper edge 32A of the secondary airbag 32 in the inflated and deployed state is arranged lower than the lower edge of the window opening 15. According to such a configuration, the secondary airbag 32 is arranged in a position corresponding to a torso of the occupant 100, and can reliably support the torso thereof.

Next, a folding method of the primary airbag 31 and the secondary airbag 32 will be described. First, as shown in FIG. 6, the primary airbag 31 and the secondary airbag 32 in the deployed state are arranged on a plane. In this state, the sheet materials of the primary airbag 31 and the secondary airbag 32 are laminated in order of the second sheet material 42, the first sheet material 41, the third sheet material 53, and the fourth sheet material 54 from a side (a far side in FIG. 6) of the primary airbag 31 opposed to the secondary airbag 32. Further, front edges of the primary airbag 31 and the secondary airbag 32 are arranged on a right side in FIG. 6, and rear edges of the primary airbag 31 and the secondary airbag 32 are arranged on a left side in FIG. 6.

The primary airbag 31 and the secondary airbag 32 are folded along first to tenth folds L1 to L10 according to the following procedure, and thus turn into the storage state in which the primary airbag 31 and the secondary airbag 32 are folded.

First, in a state shown in FIG. 6, the inflator 33 passes through the insertion hole 43 of the primary airbag 31, and is arranged inside the primary airbag 31. At this time, the two coupled portions 33B of the inflator 33 pass through the corresponding first through holes 44, and are arranged to protrude outward from the primary airbag 31.

Next, as shown in FIG. 7A, the rear end of the primary airbag 31 is folded to a side (a near side in FIG. 7A) of the secondary airbag 32 along the fifth fold L5 extending in the up-and-down direction between the two first through holes 44 and the two second through holes 45. At this time, the two second through holes 45 and the two third through holes 46 overlap with the two first through holes 44, and the two coupled portions 33B of the inflator 33 pass through the corresponding second through holes 45 so as to protrude therefrom.

Figure 7B:
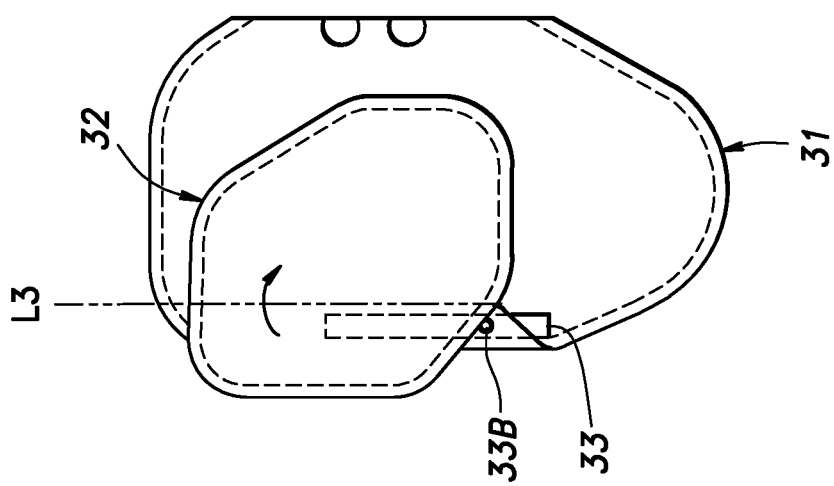
FIG. 7B is an explanatory diagram showing the folding method of the primary airbag and the secondary airbag.
Figure 7A:
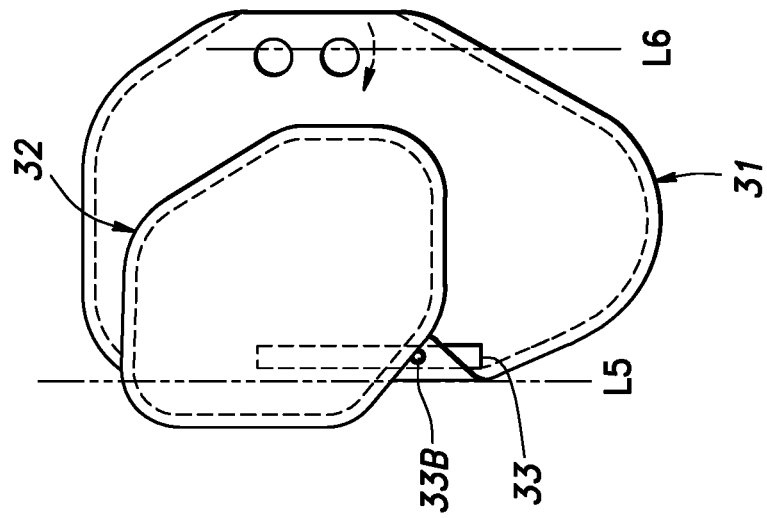
FIG. 7A is an explanatory diagram showing a folding method of the primary airbag and the secondary airbag.

Next, as shown by an arrow in FIG. 7A, the front portion of the primary airbag 31 is folded to a side opposite to the secondary airbag 32 along a sixth fold L6 extending in the up-and-down direction, and turns into a state shown in FIG. 7B. The sixth fold L6 is arranged more forward than the front edge of the secondary airbag 32. The sixth fold L6 may be arranged at a position overlapping with the first discharge holes 66.

Next, as shown by an arrow in FIG. 7B, the rear portion of the secondary airbag 32 is folded to a side opposite to the primary airbag 31 along a third fold L3 passing behind the connecting portion 55 and extending in the up-and-down direction, and turns into a state shown in FIG. 7C. In another embodiment, the third fold L3 may pass in front of the connecting portion 55 and extend in the up-and-down direction.

Next, as shown by an arrow in FIG. 7C, the upper portion of the secondary airbag 32 is folded to the side opposite to the primary airbag 31 along a first fold L1 passing above the connecting portion 55 and extending in the front-and-rear direction, and turns into a state shown in FIG. 8A. In this way, it is preferable that the secondary airbag 32 folded along the third fold L3 is folded along the first fold L1 (that is, it is preferable that the secondary airbag 32 is folded along the first fold L1 after being folded along the third fold L3). In another embodiment, the secondary airbag 32 may be folded along the third fold L3 after being folded along the first fold L1.

Next, as shown by an arrow in FIG. 8A, the upper portion of the primary airbag 31 is folded along a second fold L2 arranged higher than the first fold L1 and the inflator 33 and extending in the front-and-rear direction, and turns into a state shown in FIG. 8B. The second fold L2 extends parallel to the first fold L1 in a direction perpendicular to an extending direction of the inflator 33. It is preferable that the upper portion of the primary airbag 31 may be folded to the side opposite to the secondary airbag 32 along the second fold L2. The upper portion 71 of the primary airbag 31 folded along the second fold L2 is arranged higher than the first fold L1. That is, the upper portion 71 of the primary airbag 31 folded along the second fold L2 does not overlap with the upper portion of the secondary airbag 32 folded along the first fold L1 in the thickness direction thereof. The upper edge of the primary airbag 31 may be arranged on the first fold L1 by being folded along the second fold L2.

Next, as shown by an arrow in FIG. 8B, a lower portion of the primary airbag 31 is folded along a fourth fold L4 arranged lower than the connecting portion 55 and the inflator 33 and extending in the front-and-rear direction, and turns into a state shown in FIG. 8C. It is preferable that the fourth fold L4 is arranged lower than a lower edge of the secondary airbag 32. It is preferable that the fourth fold L4 is arranged parallel to the second fold L2.

Figure 9C:
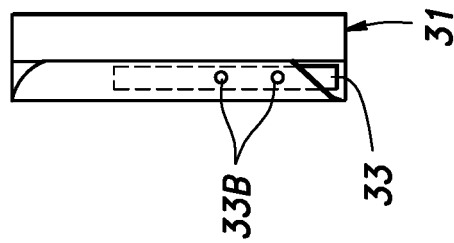
FIG. 9C is an explanatory diagram showing the folding method of the primary airbag and the secondary airbag.
Figure 9B:
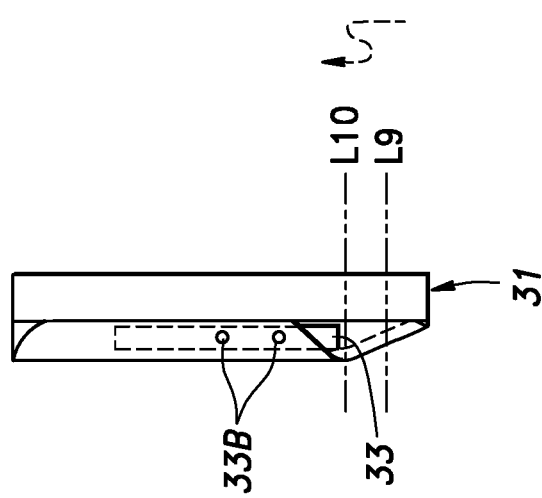
FIG. 9B is an explanatory diagram showing the folding method of the primary airbag and the secondary airbag.
Figure 9A:
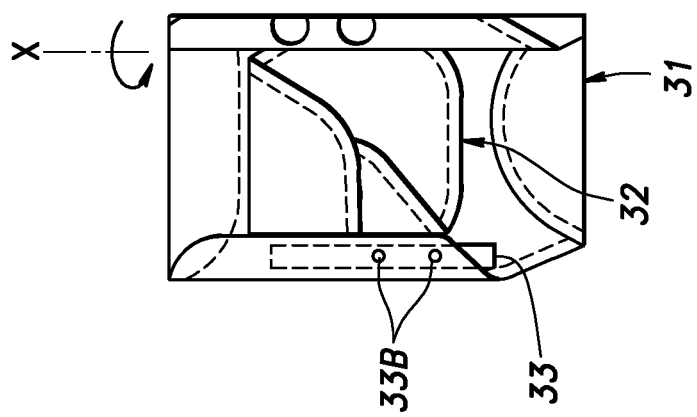
FIG. 9A is an explanatory diagram showing the folding method of the primary airbag and the secondary airbag.

Next, as shown by an arrow in FIG. 8C, the front portion of the primary airbag 31 folded along the sixth fold L6 is folded in a Z shape (folded in three) along a seventh fold L7 and an eighth fold L8 extending in the up-and-down direction, and turns into a state shown in FIG. 9A. The seventh fold L7 and the eighth fold L8 are arranged more forward than the front edge of the secondary airbag 32.

Next, as shown by an arrow in FIG. 9A, the primary airbag 31 and the secondary airbag 32 are wound toward a near side in FIG. 9A from a front side to a rear side around an axis X extending in the up-and-down direction, and turns into a state shown in FIG. 9B. In another embodiment, the primary airbag 31 and the secondary airbag 32 may be accordion-folded along a plurality of axes extending in the up-and-down direction.

Next, as shown by an arrow in FIG. 9B, lower portions of the wound primary airbag 31 and the wound secondary airbag 32 are folded in a Z shape along a ninth fold L9 and a tenth fold L10 extending in the front-and-rear direction, and thus shortened in the up-and-down direction. Accordingly, the primary airbag 31 and the secondary airbag 32 turns into the storage state shown in FIG. 9C. It is preferable that the shapes of the primary airbag 31 and the secondary airbag 32 in the storage state may be kept by a binding member such as a tape that breaks at the time of inflation of the primary airbag 31. In the storage state of the primary airbag 31 and the secondary airbag 32, the coupled portions 33B of the inflator 33 protrude outward from the primary airbag 31.

The primary airbag 31 and the secondary airbag 32 in the folded state (the storage state) are accommodated in the case 34. The coupled portions 33B of the inflator 33 pass through a through hole formed in the bottom of the case 34 and protrude to an outside. Further, the wire harness extending from the inflator 33 passes through a wiring hole and extends to the outside. In this way, the side airbag device 1 is configured as a unit.

As shown in FIG. 8B, the upper portion of the secondary airbag 32 is folded along the first fold L1, and the upper portion of the primary airbag 31 is folded along the second fold L2, so that the up-and-down length of the side airbag device 1 in the storage state can be reduced. The upper portion of the secondary airbag 32 and the upper portion of the primary airbag 31 are folded along the first fold L1 and the second fold L2 which are offset with each other in the up-and-down direction. Accordingly, the secondary airbag 32 and the primary airbag 31 can be inflated and deployed independently from each other at the time of inflation and deployment. Thus, it is possible to provide the side airbag device 1 that can smoothly deploy the primary airbag 31 and the secondary airbag 32, and can be made compact in the storage state.

The upper end of the primary airbag 31 folded along the second fold L2 does not overlap with the secondary airbag 32 in the thickness direction thereof, so that the thickness of the upper end of the side airbag device 1 in the storage state can be reduced. Accordingly, it is possible to arrange the side airbag device 1 in a side portion of the seat back 7 configured such that the front-and-rear length of an upper portion thereof is smaller than that of a lower portion thereof.

Further, as shown in FIG. 8C, the lower portion of the primary airbag 31 is folded along the fourth fold L4, so that the up-and-down length of the side airbag device 1 in the storage state can be reduced.

Next, the operation of the side airbag device 1 will be described. When detecting prescribed acceleration (acceleration equal to or greater than the threshold value) based on a signal from an acceleration sensor, the electronic control unit of the vehicle 2 supplies the electric current to the inflator 33 via the wire harness. Accordingly, the inflator 33 generates gas. The primary airbag 31 is inflated by the gas generated by the inflator 33, ruptures the third rupturable portion 38A of the case lid portion 38, the first rupturable portion 22C of the seat back 7, and the second rupturable portion 23A of the seat back 7, and is inflated forward from the side portion of the seat back 7.

The gas generated by the inflator 33 first inflates the first chamber 61 of the primary airbag 31. After that, the gas is supplied from the first chamber 61 to the secondary airbag 32 through the first communication hole 51, and thus the secondary airbag 32 is inflated. Also, the gas is supplied from the first chamber 61 to the second chamber 62 through the second communication holes 64, and thus the second chamber 62 is inflated.

The upper end of the secondary airbag 32 and the upper end of the primary airbag 31 are folded in opposite directions, so that the secondary airbag 32 and the primary airbag 31 can be inflated and deployed independently from each other.

In a state where the first chamber 61 is inflated and the first communication hole 51 is arranged more forward than the front surface 7A of the seat back 7, the secondary airbag 32 is inflated. Accordingly, the secondary airbag 32 can be smoothly inflated toward the front surface 7A of the seat back 7 without interfering with the side portion of the seat back 7. Further, the rear portion of the secondary airbag 32 in the storage state is folded forward along the third fold L3. Accordingly, when the secondary airbag 32 is inflated, the rear portion of the secondary airbag 32 rotates from a front side to a rear side around the third fold L3. Accordingly, the secondary airbag 32 can be smoothly inflated toward the front surface 7A of the seat back 7 without interfering with the side portion of the seat back 7.

As shown in FIG. 4, the rear portion of the secondary airbag 32 in the inflated and deployed state comes in contact with the inclined surface 27A of the seat back 7, so that the position of the secondary airbag 32 becomes stable. Further, the primary airbag 31 and the secondary airbag 32 hold the side support portion 27 of the seat back 7 therebetween, so that the positions of the primary airbag 31 and the secondary airbag 32 relative to the seat back 7 become stable.

The secondary airbag 32 coming in contact with the front surface 7A of the seat back 7 fills the gap between the occupant 100 and the primary airbag 31, and thus restrains the occupant 100. Accordingly, the side airbag device 1 can stabilize the position of the secondary airbag 32 at the time of inflation and deployment of the secondary airbag 32 and enhance the ability to restrain the occupant 100.

As shown in FIG. 1, the upper edge 32A (see FIG. 6) of the secondary airbag 32 can lift an arm of the occupant 100 upward at the time of inflation and deployment of the secondary airbag 32. Accordingly, the secondary airbag 32 can come in contact with the torso of the occupant 100, so that the ability to restrain the occupant 100 can be enhanced. The upper edge 32A on the front side of the secondary airbag 32 in the inflated and deployed state is arranged lower than the shoulder joint 101 of the occupant 100 seated on the seat 3. Accordingly, the secondary airbag 32 can reliably restrain an upper portion of the torso of the occupant 100. Further, the first communication hole 51 is arranged higher than an up-and-down center of the primary airbag 31 in the inflated and deployed state. Accordingly, the secondary airbag 32 is arranged in a position corresponding to the upper portion of the torso (namely, a side portion of a chest) of the occupant 100. Consequently, the secondary airbag 32 can reliably restrain the upper portion of the torso of the occupant 100.

The upper edge of the secondary airbag 32 in the inflated and deployed state is arranged lower than the upper edge of the primary airbag 31 in the inflated and deployed state. Accordingly, the upper end of the secondary airbag 32 is stably supported by the primary airbag 31 from a lateral side. Accordingly, the secondary airbag 32 can be stably inflated and deployed toward the occupant 100.

The inside of the primary airbag 31 is divided into the first chamber 61 and the second chamber 62 by the partition wall 63, and the secondary airbag 32 communicates with the first chamber 61. Accordingly, the inflation and deployment of the secondary airbag 32 can be started before the inflation and deployment of the primary airbag 31 is completed.

Concrete embodiments of the present invention have been described in the foregoing, but the present invention should not be limited by the foregoing embodiments and various modifications and alterations are possible within the scope of the present invention.

The invention claimed is:

1. A side airbag device provided in a seat back of a vehicle seat, the side airbag device comprising:
a primary airbag configured to be inflated and deployed forward and in an up-and-down direction from an outer portion of the seat back in a vehicle width direction; and
a secondary airbag connected to an inner portion of the primary airbag in the vehicle width direction, communicating with the primary airbag through a first communication hole, and configured to be inflated and deployed inward in the vehicle width direction from the primary airbag,
wherein the first communication hole is at least partially arranged more forward than a front surface of the outer portion of the seat back in an inflated and deployed state of the primary airbag,
wherein the seat back includes left and right side support portions protruding forward from left and right side portions of the seat back and extending in the up-and-down direction,
the front surface of the seat back includes an inclined surface defined by one of the side support portions on an outer side in the vehicle width direction and inclined rearward and inward in the vehicle width direction,
the secondary airbag is exposed outside the seat back and located more forward than the front surface of the seat back in the inflated and deployed state,
a rear portion of the secondary airbag is configured to come in contact with the front surface of the seat back in the inflated and deployed state.

2. The side airbag device according to claim 1, wherein the secondary airbag is configured to come in contact with the inclined surface in the inflated and deployed state.

3. The side airbag device according to claim 1, wherein the secondary airbag is provided with an upper edge inclined downward and forward in the inflated and deployed state.

4. The side airbag device according to claim 3, wherein the upper edge of the secondary airbag in the inflated and deployed state is arranged lower than an upper edge of the primary airbag in the inflated and deployed state.

5. The side airbag device according to claim 3, wherein the upper edge of the secondary airbag in the inflated and deployed state is arranged lower than a shoulder joint of an occupant seated on a seat.

6. The side airbag device according to claim 1, wherein the first communication hole is arranged higher than an up-and-down center of the primary airbag in the inflated and deployed state.

7. The side airbag device according to claim 1, wherein the primary airbag includes a partition wall dividing an inside thereof into a first chamber and a second chamber,
the partition wall is provided with a second communication hole through which the first chamber and the second chamber communicate with each other,
the first chamber is provided with an inflator, and
the first chamber and an inside of the secondary airbag communicate with each other through the first communication hole.

8. The side airbag device according to claim 1, wherein a door is provided on an outer side of the seat back in the vehicle width direction,
the door is provided with an armrest protruding inward in the vehicle width direction and provided with a mount surface facing upward, and
a lower edge of the secondary airbag in the inflated and deployed state is arranged higher than the mount surface.

9. The side airbag device according to claim 8, wherein the lower edge of the secondary airbag in the inflated and deployed state extends horizontally in a front-and-rear direction.

10. The side airbag device according to claim 8, wherein a window opening is provided in an upper portion of the door, and
an upper edge of the secondary airbag in the inflated and deployed state is arranged lower than the window opening.

11. A side airbag device provided in a seat back of a vehicle seat, the side airbag device comprising:
a primary airbag configured to be inflated and deployed forward and in an up-and-down direction from an outer portion of the seat back in a vehicle width direction; and
a secondary airbag connected to an inner portion of the primary airbag in the vehicle width direction, communicating with the primary airbag through a first communication hole, and configured to be inflated and deployed inward in the vehicle width direction from the primary airbag,
wherein the first communication hole is at least partially arranged more forward than a front surface of the outer portion of the seat back in an inflated and deployed state of the primary airbag, and
the secondary airbag is configured to come in contact with the front surface of the seat back in the inflated and deployed state,
wherein the secondary airbag is provided with an upper edge inclined downward and forward in the inflated and deployed state.

12. The side airbag device according to claim 11, wherein the seat back includes left and right side support portions protruding forward from left and right side portions of the seat back and extending in the up-and-down direction,
the front surface of the seat back includes an inclined surface defined by one of the side support portions on an outer side in the vehicle width direction and inclined rearward and inward in the vehicle width direction, and
the secondary airbag is configured to come in contact with the inclined surface in the inflated and deployed state.

13. The side airbag device according to claim 11, wherein the upper edge of the secondary airbag in the inflated and deployed state is arranged lower than an upper edge of the primary airbag in the inflated and deployed state.

14. The side airbag device according to claim 11, wherein the upper edge of the secondary airbag in the inflated and deployed state is arranged lower than a shoulder joint of an occupant seated on a seat.

15. A side airbag device provided in a seat back of a vehicle seat, the side airbag device comprising:
- a primary airbag configured to be inflated and deployed forward and in an up-and-down direction from an outer portion of the seat back in a vehicle width direction; and
- a secondary airbag connected to an inner portion of the primary airbag in the vehicle width direction, communicating with the primary airbag through a first communication hole, and configured to be inflated and deployed inward in the vehicle width direction from the primary airbag,
wherein the first communication hole is at least partially arranged more forward than a front surface of the outer portion of the seat back in an inflated and deployed state of the primary airbag, and the secondary airbag is configured to come in contact with the front surface of the seat back in the inflated and deployed state,
wherein the primary airbag includes a partition wall dividing an inside thereof into a first chamber and a second chamber,
the partition wall is provided with a second communication hole through which the first chamber and the second chamber communicate with each other,
the first chamber is provided with an inflator, and
the first chamber and an inside of the secondary airbag communicate with each other through the first communication hole.

16. The side airbag device according to claim 15, wherein the seat back includes left and right side support portions protruding forward from left and right side portions of the seat back and extending in the up-and-down direction,
the front surface of the seat back includes an inclined surface defined by one of the side support portions on an outer side in the vehicle width direction and inclined rearward and inward in the vehicle width direction, and
the secondary airbag is configured to come in contact with the inclined surface in the inflated and deployed state.

* * * * *